June 15, 1937.   S. L. PEARSON   2,083,663
FRUIT DIPPER
Filed June 26, 1936

INVENTOR
Sadye L. Pearson
BY
ATTORNEY

Patented June 15, 1937

2,083,663

UNITED STATES PATENT OFFICE 2,083,663

FRUIT DIPPER

Sadye L. Pearson, Colusa, Calif.

Application June 26, 1936, Serial No. 87,394

1 Claim. (Cl. 65—28)

This invention relates generally to a culinary utensil and is directed in particular to a fruit dipper.

In the process of preserving fruits and vegetables, especially in the home, it is always a difficult task to remove the cooked substances and juice from the kettle and pour the ame into the jars or other containers in which they are to be preserved.

It is therefore the object of my present invention to provide a fruit dipper by means of which the cooked fruit or vegetables and the juice may be readily dipped from the kettle and poured into the containers without material risk of spilling the contents of the dipper.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
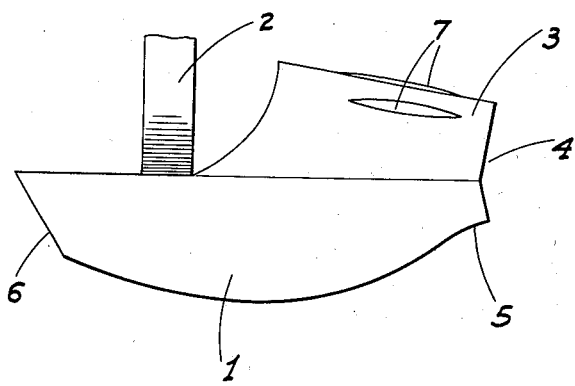
Fig. 1 is a side elevation of my improved fruit dipper.
Figure 2:
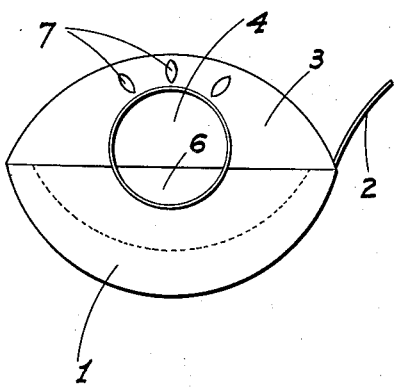
Fig. 2 is an end view of the fruit dipper.
Figure 3:
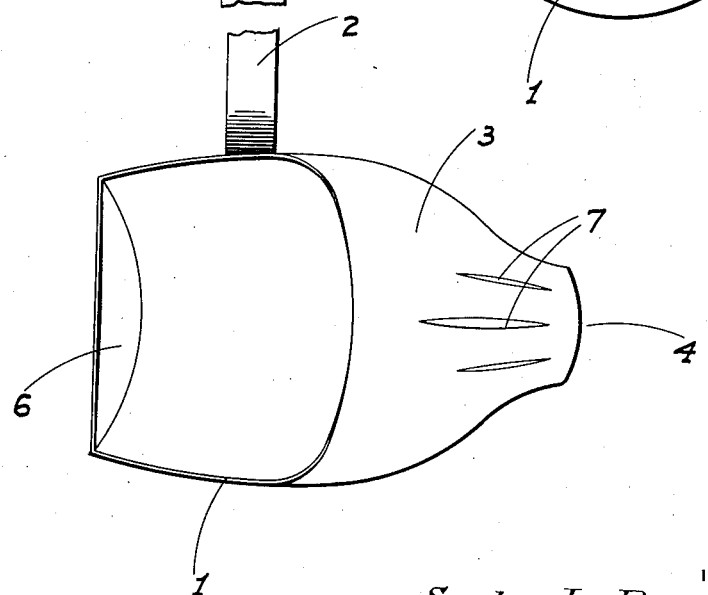
Fig. 3 is a top plan of the device.

Referring now more particularly to the characters of reference on the drawing, the device comprises an elongated ladle 1 which converges towards its front end. A relatively long handle 2 is secured at its lower end to one side of the ladle adjacent the rear portion thereof and extends upwardly and outwardly therefrom.

The forward portion of the ladle is enclosed or covered by a shell or hood 3 secured thereto. Both the shell and ladle converge forwardly to form a substantially circular discharge opening 4 in the forward end of the dipper; the major portion of said opening being formed by the shell 3.

That part of the ladle which extends about the discharge opening 4 is lipped as at 5 for the purpose to be hereinafter described.

The rear end 6 of the ladle is straight across its top edge and slopes forwardly from said edge toward its lower edge to form in effect, a scoop on the rear of the dipper. Raised ribs 7 are formed on the outer face of the shell 3 adjacent the forward end of the dipper and serve the purpose hereinafter described.

Use

In use, a person grasps the handle 2 and dips or scoops the rear end of the dipper into the cooked fruit, etc., and juice in the kettle. Due to the fact that the rear end 6 of the device is straight on its top edge and then slopes forward toward its lower edge, it is extremely easy to fill the dipper.

After the dipper is filled from the kettle, the lip 5 on the ladle is engaged with the upper edge of the jar or other container into which the fruit and juice are to be poured. The dipper is then gradually tilted about the lip towards a vertical position to cause the contents of the dipper to flow through the discharge opening 4 into the jar or other container.

The shell, of course, enclosing the forward portion of the ladle, prevents spillage and serves as a retainer for the contents prior to discharge through opening 4.

When the dipper is finally turned to a vertical position to allow the last of its contents to flow into the jar, the forward end of the dipper usually projects a short distance into the mouth thereof. When this occurs, the ribs 7 engage the mouth of the jar and permit escape of excess air or steam from the jar and which would otherwise "flow back" through opening 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not from a departure from the spirit of the invention, as defined by the appended claim.

Having thus described my invention, what I claim as new and useful and desire to secure by Letters Patent is:

In a fruit dipper including a ladle, a handle for the ladle and a shell enclosing the forward portion of the ladle, the shell and adjacent portion of the ladle being rounded and converging forward to form a substantially circular pouring spout; an upstanding longitudinally extending rib formed on the exterior of said spout whereby when the spout is placed in the mouth of a container the rib will engage the mouth and maintain the adjacent portion of the spout spaced from said mouth.

SADYE L. PEARSON.